(12) United States Patent
Van Triest et al.

(10) Patent No.: US 10,401,251 B2
(45) Date of Patent: Sep. 3, 2019

(54) FILM CHAMBER WITH RETAINING PROFILE

(71) Applicant: INFICON GmbH, Cologne (DE)

(72) Inventors: Hendrik Van Triest, Cologne (DE); Michael Dauenhauer, Cologne (DE)

(73) Assignee: INFICON GmbH, Cologne (DE)

( * ) Notice: Subject to any disclaimer, the term of this patent is extended or adjusted under 35 U.S.C. 154(b) by 179 days.

(21) Appl. No.: 15/511,907

(22) PCT Filed: Sep. 16, 2015

(86) PCT No.: PCT/EP2015/071180
§ 371 (c)(1),
(2) Date: Mar. 16, 2017

(87) PCT Pub. No.: WO2016/046039
PCT Pub. Date: Mar. 31, 2016

(65) Prior Publication Data
US 2017/0292891 A1     Oct. 12, 2017

(30) Foreign Application Priority Data
Sep. 25, 2014 (DE) .................. 10 2014 219 473

(51) Int. Cl.
*G01M 3/02* (2006.01)
*G01M 3/32* (2006.01)

(52) U.S. Cl.
CPC ............ *G01M 3/02* (2013.01); *G01M 3/3218* (2013.01); *G01M 3/3281* (2013.01)

(58) Field of Classification Search
CPC ..... G01M 3/02; G01M 3/3218; G01M 3/3281

USPC ............................................................ 73/40
See application file for complete search history.

(56) References Cited

U.S. PATENT DOCUMENTS

| | | | | |
|---|---|---|---|---|
| 3,792,606 A | * | 2/1974 | Munger | G01M 3/02 73/40 |
| 3,813,923 A | | 6/1974 | Pendleton | |
| 3,973,249 A | * | 8/1976 | Yokote | G01M 3/186 73/49.3 |
| 5,285,678 A | * | 2/1994 | McDaniel | G01M 3/3281 73/49.3 |
| 5,513,516 A | * | 5/1996 | Stauffer | G01M 3/3218 73/49.2 |

(Continued)

FOREIGN PATENT DOCUMENTS

| | | |
|---|---|---|
| DE | 19846800 A1 | 4/2000 |
| DE | 19935293 A1 | 2/2001 |

(Continued)

*Primary Examiner* — Natalie Huls
*Assistant Examiner* — Monica S Young
(74) *Attorney, Agent, or Firm* — The Webb Law Firm

(57) ABSTRACT

The invention relates to a film chamber for receiving a test object to be tested for the presence of a leak, including at least two film layers and at least two frame elements, each of which has a sealing surface so that the two frame elements lie against each other in a gas-tight manner in order to hermetically seal the film chamber. Each of the two film layers has at least one retaining profile in a wall region, and each of the two frame elements has at least one retaining groove in the frame element sealing surface in order to receive a retaining profile such that the two film layers are held between the two frame elements substantially by a formfitting connection.

20 Claims, 1 Drawing Sheet

(56) References Cited

U.S. PATENT DOCUMENTS

| | | | | |
|---|---|---|---|---|
| 5,875,918 A * | 3/1999 | Sheffler | ............... | A45C 13/008 |
| | | | | 220/326 |
| 6,732,571 B1 | 5/2004 | Flosbach | | |
| 6,955,076 B1 * | 10/2005 | Widt | ..................... | G01M 3/227 |
| | | | | 73/40.7 |
| 2014/0311222 A1 * | 10/2014 | Decker | ............... | G01M 3/3218 |
| | | | | 73/40 |
| 2014/0326051 A1 * | 11/2014 | Wetzig | ................ | G01M 3/3281 |
| | | | | 73/40 |

FOREIGN PATENT DOCUMENTS

| | | | |
|---|---|---|---|
| DE | 102010015237 | A1 | 10/2011 |
| DE | 102012200063 | A1 | 7/2013 |
| JP | 09222144 | A | 8/1997 |
| JP | 10185752 | A | 7/1998 |
| JP | 2001522337 | A | 11/2001 |
| JP | WO02103430 | A1 | 12/2002 |
| JP | 2015506472 | A | 3/2015 |
| WO | 9527194 | A1 | 10/1995 |
| WO | 2013102610 | A1 | 7/2013 |

* cited by examiner

FILM CHAMBER WITH RETAINING PROFILE

CROSS-REFERENCE TO RELATED APPLICATIONS

This application is the United States national phase of International Application No. PCT/EP2015/071180 filed Sep. 16, 2015, and claims priority to German Patent Application No. 10 2014 219 473.3 filed Sep. 25, 2014, the disclosures of which are hereby incorporated in their entirety by reference.

BACKGROUND OF THE INVENTION

Field of the Invention

The invention relates to a film chamber for receiving a test object to be tested for the presence of a leak.

Description of Related Art

A film chamber is a special form of a test chamber for receiving a test object to be tested for tightness. The film chamber is characterized by the fact that at least one wall portion is made of a flexible material (film). A test object to be tested for the presence of a leak is placed inside the film chamber and the film chamber is evacuated subsequently. When evacuating the film chamber, air is drawn from the film chamber whereby the flexible film chamber wall clings to the test object. A particularly suitable film chamber comprises two film layers which enclose the test object and are connected with each other in a gas-tight manner at their edge portions.

For a gas-tight closure of the film chamber, the same is sealed in a frame region. In this context it is known to clamp the film layers between clamping surfaces of frame elements, wherein, due to the frame elements being pressed together, the film layers are retained by surface pressure. The frame elements have to be pressed against each other with great force. This may cause deformations of the frame elements which may result in only a small portion of the clamping surface transmitting the clamping force onto the film. The film layer may become detached from the clamped fitting when exposed to tensile stress.

It is an object of the present invention to provide a film chamber with an improved fastening of the film layers.

SUMMARY OF THE INVENTION

According to the present invention, each of the at least two film layers has a retaining profile in its edge portion, which profile is caused to engage a corresponding retaining groove in the clamping surface of the respective frame element in order to create a form-fitting connection between the film layer and the frame element. Each film layer is then retained on the respective frame element without the conventional surface pressure being required. The two frame elements are subsequently placed against each other by their sealing elements so as to provide a gas-tight connection between the film chamber halves in the edge portion thereof. For this purpose, it is necessary to merely apply a force on the frame elements that is sufficient to create a contact between the lip seal and the sealing surface. Thus, the force to be applied on the frame elements no longer has to be that high in order to clamp the film layers between the clamping surfaces. Thereby, the connection between the film layers and the frame elements is more stable, while less force has to be applied on the frame elements.

Preferably, exactly two film layers are provided between the test object is placed centrally. Each of the two film layers is then retained in the edge portion on exactly one frame element. The frame element is formed circumferentially about the outer edge of the film layer and may be a single element or be assembled from a plurality of elements. At least one circumferential seal, e.g. in form of an O-ring seal, is preferably provided between the two clamping surfaces of the two frame elements in order to provide a gas-tight fitting of the two frame elements relative to each other.

The retaining profile at the edge portion of each film layer is designed as a protrusion or a nose. The associated retaining groove of the respective frame element is formed to be complementary to the retaining profile. Retaining profile and retaining nose may have an undercut shape for a particularly firm hold. It is particularly advantageous if the edge portion of the retaining profile and the retaining groove each form a traverse when seen in cross section. In this case it is not possible to lever out the retaining profile from the retaining groove when the film layer is exposed to tensile stress.

A retaining element can be mounted on each frame element and preferably on the clamping surface of the same, which retaining element secures the retaining profile against slipping out of the retaining groove. The retaining element may e.g. be screwed to the clamping surface and cover the clamping groove.

BRIEF DESCRIPTION OF THE DRAWINGS

The following is a detailed explanation of an embodiment of the invention with reference to the Figures. In the Figures.

DETAILED DESCRIPTION OF THE INVENTION

Figure 1:
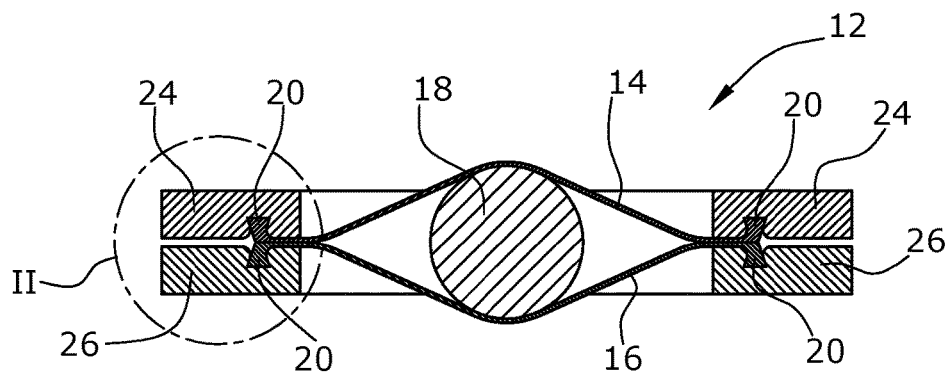
FIG. 1 is a section through the film chamber and
FIG. 2 shows the detail indicated as II in FIG. 1.
Figure 2:
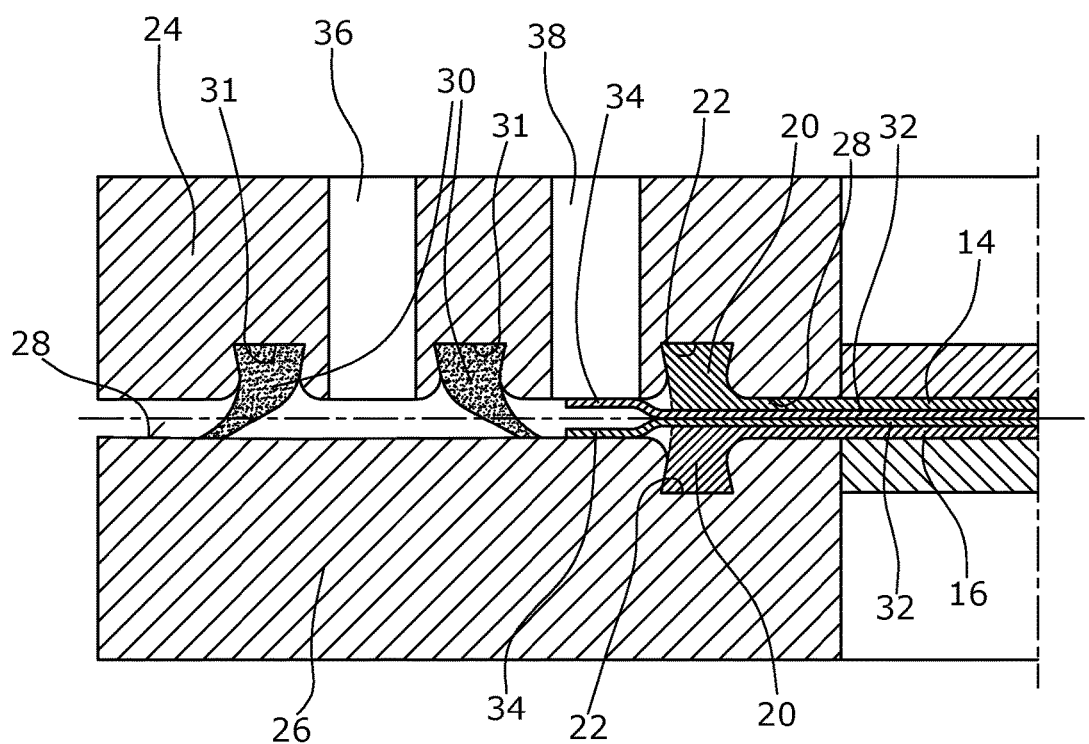

The film chamber 12 has two film layers 14, 16 placed against each other at their edge portions and enclosing a test object in the middle between them. Each film layer 14, 16 has a circumferential retaining profile 20 in its edge portion, which is formed integrally with the respective film layer 14, 16. The retaining profile 20 of the film layer 14 is inserted into a retaining groove 22 of a first edge element 24. The retaining profile 20 of the lower film layer 16 is inserted into a retaining groove 22 of a second frame element 26. The retaining grooves 22 are each formed in a surface of the respective frame element 24, 26. The retaining grooves 22 are circumferential depressions whose shape is complementary with the shape of the respective retaining profile 20. Each retaining profile 20 is designed as a circumferential protrusion in the edge portion of the film layer. Each film layer 14, 16 may in particular also have a plurality of different circumferential profiles engaging a plurality of corresponding retaining grooves with different circumferential profiles formed in the respective frame element.

The frame elements 24, 26 are placed against each other by their clamping surfaces 28, wherein a seal 30 is retained between the clamping surfaces 28 in order to provide a gas-tight connection for a hermetically closed film chamber 12. The seal 30 is formed by two spaced apart sealing lips which are each retained in a seal groove 31 of the one frame element 24 and are pressed against the clamping surface 28 of the other retaining element 28. In said one of the two frame elements 24 a ventilation channel 36 is formed between the two sealing lips, via which the gap between the two sealing lips and the adjacent clamping surfaces 28 can be evacuated. Further, a ventilation channel 38 is provided in one of the two frame elements 24 between the seal 30 and the retaining profiles 20 of the film layers 14, 16. The gap between the two film layers 14, 16, and thus the film chamber 12, is evacuated through this ventilation channel 38.

Each retaining groove 22 is covered by a gas-carrying element 32 so as to secure the respective retaining profile 20 against slipping from the retaining groove 22. Each gas-carrying element 22 is fastened to the respective clamping surface 28 by means of a hook-and-loop-type fastener 34.

The invention offers the advantage that the film layers 14, 16 do not have to be lamped in the two frame elements 24, 26 by surface pressure in order to create a stable connection that is sufficiently resistant to tensile stress. The frame elements have to be pressed against each other using only so much force that a gas-tight connection is formed. The engagement between the retaining profile 20 and the retaining groove 22 forms a form-fitting, gas-tight seat allowing for a sufficient tensile stress resistance of the respective film layer 14, 16.

The invention claimed is:

1. A film chamber for receiving a test object to be tested for the presence of a leak, comprising at least two flexible film layers and at least two frame elements, each of which has a sealing surface so that the two frame elements lie against each other in a gas-tight manner in order to hermetically seal the film chamber,
wherein
each of the two film layers has at least one retaining profile in an edge portion, and each of the two frame elements has at least one retaining groove in the frame element sealing surface shaped to match the dimensions of the retaining profile in order to receive said retaining profile in such a way that the two film layers are held between the two frame elements by a form-fitting connection without a surface pressing being required between the two sealing surfaces.

2. The film chamber of claim 1, wherein each film layer comprises the retaining profile either integrally or as a separate member glued or welded thereto.

3. The film chamber of claim 2, wherein each film layer comprises the retaining profile molded thereto.

4. The film chamber of claim 3, wherein the retaining profile and the retaining groove are designed to be complementary with each other and the retaining groove is undercut from the clamping surface.

5. The film chamber of claim 2, wherein the retaining profile and the retaining groove are designed to be complementary with each other and the retaining groove is undercut from the clamping surface.

6. The film chamber of claim 2, wherein an outer contour of the cross section of each retaining profile forms a polygonal line.

7. The film chamber of claim 2, wherein each frame element is provided with a gas-carrying element such that the gas-carrying element prevents the retaining pro-file from inadvertently slipping out of the retaining groove.

8. The film chamber of claim 7, wherein each frame element is provided with a gas-carrying element such that the gas-carrying element prevents the retaining pro-file from inadvertently slipping out of the retaining groove.

9. The film chamber of claim 2, wherein a gas-tight seal is provided between the sealing surfaces of the two frame elements.

10. The film chamber of claim 1, wherein the retaining profile and the retaining groove are designed to be complementary with each other and the retaining groove is undercut from the clamping surface.

11. The film chamber of claim 10, wherein a gas-tight seal is provided between the sealing surfaces of the two frame elements.

12. The film chamber of claim 1, wherein an outer contour of the cross section of each retaining profile forms a polygonal line.

13. The film chamber of claim 12, wherein each frame element is provided with a gas-carrying element such that the gas-carrying element prevents the retaining pro-file from inadvertently slipping out of the retaining groove.

14. The film chamber of claim 1, wherein each frame element is provided with a gas-carrying element such that the gas-carrying element prevents the retaining pro-file from inadvertently slipping out of the retaining groove.

15. The film chamber of claim 1, wherein a gas-tight seal is provided between the sealing surfaces of the two frame elements.

16. The film chamber of claim 15, wherein a ventilation channel for evacuation of the film chamber is provided in at least one of the two frame elements between the seal and the retaining profile.

17. The film chamber of claim 15, wherein the seal is provided by at least two spaced apart sealing lips respectively retained in a retaining groove in one of the frame elements.

18. The film chamber of claim 17, wherein a ventilation channel for evacuation of the film chamber is provided in at least one of the two frame elements between the seal and the retaining profile.

19. The film chamber of claim 17, wherein a ventilation channel is provided in one of the two frame elements between the two sealing lips.

20. The film chamber of claim 19, wherein a ventilation channel for evacuation of the film chamber is provided in at least one of the two frame elements between the seal and the retaining profile.

\* \* \* \* \*

UNITED STATES PATENT AND TRADEMARK OFFICE
CERTIFICATE OF CORRECTION

PATENT NO. : 10,401,251 B2
APPLICATION NO. : 15/511907
DATED : September 3, 2019
INVENTOR(S) : Hendrik Van Triest et al.

It is certified that error appears in the above-identified patent and that said Letters Patent is hereby corrected as shown below:

In the Claims

Column 3, Line 27, through Column 4, Line 53, delete Claims 1 - 20 as follows:
"1. A film chamber for receiving a test object to be tested for the presence of a leak, comprising at least two flexible_film layers and at least two frame elements, each of which has a sealing surface so that the two frame elements lie against each other in a gas-tight manner in order to hermetically seal the film chamber,
wherein
each of the two film layers has at least one retaining profile in an edge portion, and each of the two frame elements has at least one retaining groove in the frame element sealing surface shaped to match the dimensions of the retaining profile in order to receive said retaining profile in such a way that the two film layers are held between the two frame elements by a form-fitting connection without a surface pressing being required between the two sealing surfaces.
2. The film chamber of claim 1, wherein each film layer comprises the retaining profile either integrally or as a separate member glued or welded thereto.
3. The film chamber of claim 2, wherein each film layer comprises the retaining profile molded thereto.
4. The film chamber of claim 3, wherein the retaining profile and the retaining groove are designed to be complementary with each other and the retaining groove is undercut from the clamping surface.
5. The film chamber of claim 2, wherein the retaining profile and the retaining groove are designed to be complementary with each other and the retaining groove is undercut from the clamping surface.
6. The film chamber of claim 2, wherein an outer contour of the cross section of each retaining profile forms a polygonal line.
7. The film chamber of claim 2, wherein each frame element is provided with a gas-carrying element such that the gas-carrying element prevents the retaining pro-file from inadvertently slipping out of the retaining groove.
8. The film chamber of claim 7, wherein each frame element is provided with a gas-carrying element such that the gas-carrying element prevents the retaining pro-file from inadvertently slipping out of the retaining groove.

Signed and Sealed this
Twenty-eighth Day of February, 2023

Katherine Kelly Vidal
*Director of the United States Patent and Trademark Office*

9. The film chamber of claim 2, wherein a gas-tight seal is provided between the sealing surfaces of the two frame elements.
10. The film chamber of claim 1, wherein the retaining profile and the retaining groove are designed to be complementary with each other and the retaining groove is undercut from the clamping surface.
11. The film chamber of claim 10, wherein a gas-tight seal is provided between the sealing surfaces of the two frame elements.
12. The film chamber of claim 1, wherein an outer contour of the cross section of each retaining profile forms a polygonal line.
13. The film chamber of claim 12, wherein each frame element is provided with a gas-carrying element such that the gas-carrying element prevents the retaining pro-file from inadvertently slipping out of the retaining groove.
14. The film chamber of claim 1, wherein each frame element is provided with a gas-carrying element such that the gas-carrying element prevents the retaining pro-file from inadvertently slipping out of the retaining groove.
15. The film chamber of claim 1, wherein a gas-tight seal is provided between the sealing surfaces of the two frame elements.
16. The film chamber of claim 15, wherein a ventilation channel for evacuation of the film chamber is provided in at least one of the two frame elements between the seal and the retaining profile.
17. The film chamber of claim 15, wherein the seal is provided by at least two spaced apart sealing lips respectively retained in a retaining groove in one of the frame elements.
18. The film chamber of claim 17, wherein a ventilation channel for evacuation of the film chamber is provided in at least one of the two frame elements between the seal and the retaining profile.
19. The film chamber of claim 17, wherein a ventilation channel is provided in of the two frame elements between the two sealing lips.
20. The film chamber of claim 19, wherein a ventilation channel for evacuation of the film chamber is provided in at least one of the two frame elements between the seal and the retaining profile."

And insert Claims 1 - 20 as follows:
-- 1. A film chamber for receiving a test object to be tested for the presence of a leak, comprising at least two flexible film layers and at least two frame elements, each of which has a sealing surface so that the two frame elements lie against each other in a gas-tight manner in order to hermetically seal the film chamber,
wherein
each of the two film layers has at least one retaining profile in an edge portion, and each of the two frame elements has at least one retaining groove in the frame element sealing surface shaped to match the dimensions of the retaining profile in order to receive said retaining profile in such a way that the two film layers are held between the two frame elements by a form-fitting connection without a surface pressing being required between the two sealing surfaces.
2. The film chamber of claim 1, wherein each film layer comprises the retaining profile either integrally or as a separate member glued or welded thereto.
3. The film chamber of claim 2, wherein each film layer comprises the retaining profile molded thereto.
4. The film chamber of claim 3, wherein the retaining profile and the retaining groove are designed to be complementary with each other and the retaining groove is undercut from the clamping surface.
5. The film chamber of claim 2, wherein the retaining profile and the retaining groove are designed to be complementary with each other and the retaining groove is undercut from the clamping surface.

6. The film chamber of claim 2, wherein an outer contour of the cross section of each retaining profile forms a polygonal line.
7. The film chamber of claim 2, wherein each frame element is provided with a gas-carrying element such that the gas-carrying element prevents the retaining pro-file from inadvertently slipping out of the retaining groove.
8. The film chamber of claim 1, wherein an outer contour of the cross section of each retaining profile forms a polygonal line.
9. The film chamber of claim 2, wherein a gas-tight seal is provided between the sealing surfaces of the two frame elements.
10. The film chamber of claim 1, wherein the retaining profile and the retaining groove are designed to be complementary with each other and the retaining groove is undercut from the clamping surface.
11. The film chamber of claim 10, wherein a gas-tight seal is provided between the sealing surfaces of the two frame elements.
12. The film chamber of claim 10, wherein each frame element is provided with a gas-carrying element such that the gas-carrying element prevents the retaining pro-file from inadvertently slipping out of the retaining groove.
13. The film chamber of claim 8, wherein each frame element is provided with a gas-carrying element such that the gas-carrying element prevents the retaining pro-file from inadvertently slipping out of the retaining groove.
14. The film chamber of claim 1, wherein each frame element is provided with a gas-carrying element such that the gas-carrying element prevents the retaining pro-file from inadvertently slipping out of the retaining groove.
15. The film chamber of claim 1, wherein a gas-tight seal is provided between the sealing surfaces of the two frame elements.
16. The film chamber of claim 15, wherein a ventilation channel for evacuation of the film chamber is provided in at least one of the two frame elements between the seal and the retaining profile.
17. The film chamber of claim 15, wherein the seal is pro-vided by at least two spaced apart sealing lips respectively retained in a retaining groove in one of the frame elements.
18. The film chamber of claim 17, wherein a ventilation channel for evacuation of the film chamber is provided in at least one of the two frame elements between the seal and the retaining profile.
19. The film chamber of claim 17, wherein a ventilation channel is provided in one of the two frame elements between the two sealing lips.
20. The film chamber of claim 19, wherein a ventilation channel for evacuation of the film chamber is provided in at least one of the two frame elements between the seal and the retaining profile. --